(12) United States Patent
Chu (10) Patent No.: US 10,055,623 B2
(45) Date of Patent: Aug. 21, 2018

(54) MONITORING SYSTEM AND METHOD FOR A BOLTING OPERATION

(71) Applicant: CHINA PNEUMATIC CORPORATION, Taoyuan (TW)

(72) Inventor: Hsiu-Feng Chu, Taoyuan (TW)

(73) Assignee: China Pneumatic Corporation, Taoyuan (TW)

(*) Notice: Subject to any disclaimer, the term of this patent is extended or adjusted under 35 U.S.C. 154(b) by 0 days.

(21) Appl. No.: 15/634,655

(22) Filed: Jun. 27, 2017

(65) Prior Publication Data
US 2018/0012047 A1    Jan. 11, 2018

(30) Foreign Application Priority Data
Jul. 5, 2016  (TW) .................................. 105121151

(51) Int. Cl.
*G06F 17/00*    (2006.01)
*G06K 7/10*     (2006.01)

(52) U.S. Cl.
CPC ................ *G06K 7/10366* (2013.01)

(58) Field of Classification Search
CPC ................................................. G06K 7/10366
USPC ....................................................... 235/375
See application file for complete search history.

(56) References Cited

U.S. PATENT DOCUMENTS

| 7,779,704 | B1 | 8/2010 | Chu |
| 9,026,379 | B2 | 5/2015 | Chu et al. |
| 2015/0041162 | A1 | 2/2015 | Chu et al. |
| 2016/0039093 | A1* | 2/2016 | Abdallah ............... B25J 9/1687 700/257 |

FOREIGN PATENT DOCUMENTS

| TW | I342821 | 6/2011 |
| TW | I454346 | 10/2014 |

* cited by examiner

*Primary Examiner* — Karl D Frech
(74) *Attorney, Agent, or Firm* — Muncy, Geissler, Olds & Lowe, P.C.

(57) ABSTRACT

Provided herein is a monitoring system and method for a bolting operation, during which a torque tool is coupled to a torque sensing and transmitting adapter disposed of with an RFID reader or a middle device to read the information in the RFID tag attached to each bolt following the preset bolting sequence. After receiving the information, a torque control device evaluates whether the bolts are valid and memorizes the bolting sequence, edits and stores in the memory. The torque control device continuously monitors whether the operator does follow the programmed bolting sequence and the bolting mode to fasten the bolt with target torque value and issues a warning if otherwise. Meanwhile, the torque control device writes the bolting information in the tag or stores the information in a peripheral server or in a cloud server via the Internet for later inquiry.

13 Claims, 10 Drawing Sheets

```
┌─────────────────────────────────────────────┐
│  A transducing device 3' is coupled to the torque tool 5 to │
│  drive a sensing bolt 2' or a tag bolt 2". Alternatively, a │
│  tansducing device 3" including a transmitting driving head is │
│  used to drive a sensing hexagon socket head bolt 2''' or tag │
│  hexagon socket head bolt 2''''.            │
└─────────────────────────────────────────────┘
                    ↓
┌─────────────────────────────────────────────┐
│  While pre-bolting, the RFID reader 33' of the transducing │
│  device 3' or the transducing device 3" scans the operator's ID │         The bolt is not valid
│  through the RFID antenna 331'. According to the present    │ ──────────────────────→
│  bolting sequence, the tag identification code on the bolt is │
│  read. According to the production traceability information of │
│  the bolt stored in the tag, the specification of the bolt is │         ┌──────────────────────────────┐
│  evaluated.                                 │         │ the torque control device 4 issues a │
└─────────────────────────────────────────────┘         │ warning and disables the torque tool │
                    ↓ YES                               │              5.              │
                                                        └──────────────────────────────┘
```

The tag identification code is sent to the control module 41 through the communication unit 34' of the transducing device 3' or 3" and through the communication module 43 of the torque control device 4. Meanwhile, the torque control device 4 sets up the number of steps required for bolting and the value of the torque required for each step of modes for fastening each bolt. The torque control device 4 also selects the coaxial bolt sequence programming direction for bolting, e.g. clockwise or counterclockwise for the bolt sequence programming operation. The torque control device 4 continuously monitors whether the bolting sequence, the bolting mode for each step, and the torque applied in each step are correct. A warning will be issued if they are not correct.

Incorrect →

The power torque tool can only be activated if the problem is resolved, and the torque control device 4 issues a warning if the torque tool is operated manually.

↓ YES

After finishing the bolting operation, torque control device 4 sends the bolting operation related information to the communication unit 34' of the transducing device 3' or 3'" through the communication module 43. The microprocessor 32' then send the information to the RFID 331' of the RFID reader 33', which writes the information in the tag of the bolt. Alternatively, the information is sent to a peripheral or cloud server through the input output module 44 of the torque control device 4 for later inquiry.

MONITORING SYSTEM AND METHOD FOR A BOLTING OPERATION

This application claims priority from Taiwan Patent Application No. 105121151, filed on Jul. 5, 2016 at the Taiwan Intellectual Property Office, the content of which is hereby incorporated by reference in its entirety for all purposes.

BACKGROUND OF THE INVENTION

1. Field of the Invention

The present invention relates to a bolting operation monitoring system and method. More particularly, the present invention relates to a system and method of monitoring a bolting operation by a torque sensing and transmitting adapter including an RFID reader or a middle device such as a transducing device together with a torque control device and a bolt with an RFID tag.

2. Description of the Related Art

Figure 1:
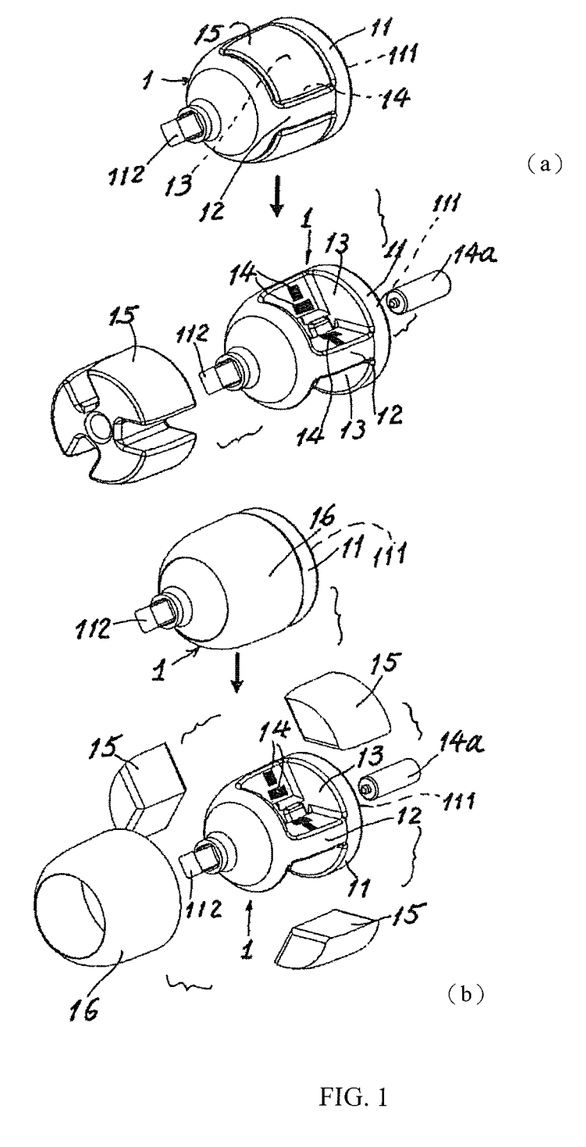
FIG. 1 shows the conventional torque sensing and transmitting adapter in FIGS. 3 and 4 of the mentioned document.
Figure 2:
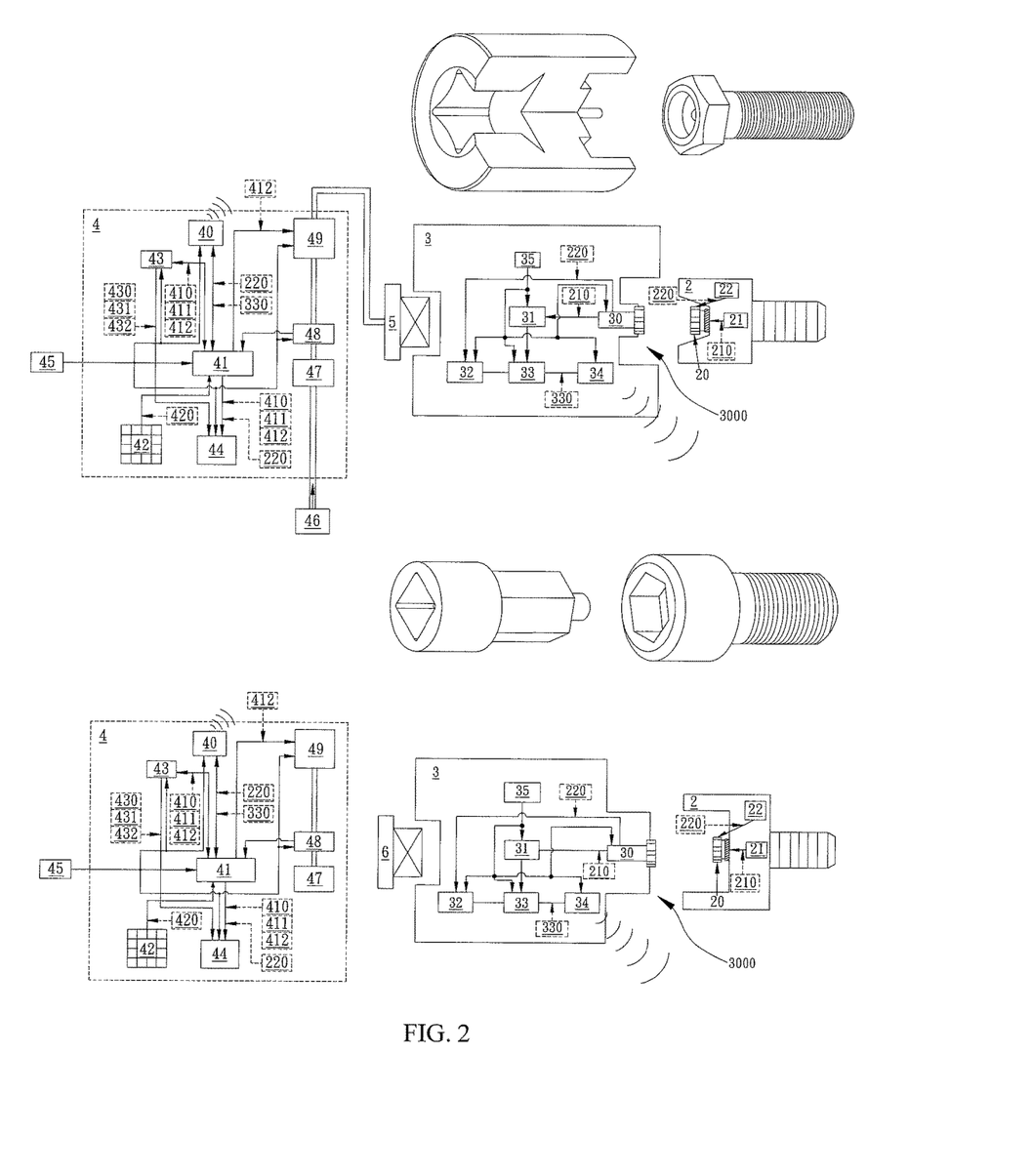
FIG. 2 shows the transducing device and the sensing bolt in FIGS. 6 and 7 of the mentioned document.
Figure 3:
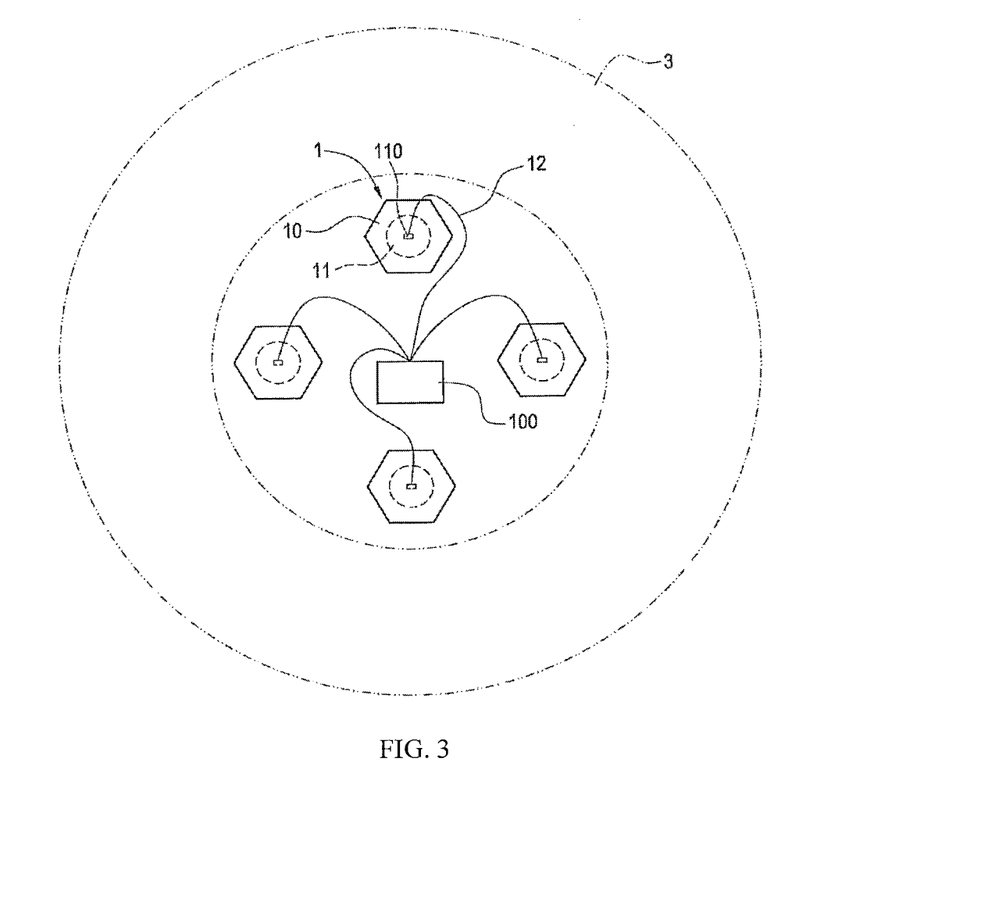
FIG. 3 shows bolting method in FIG. 2 of the mentioned document.

The conventional technique of Taiwan Patent no. I342821 (U.S. Pat. No. 7,779,704B1) mainly focuses on using shock absorbable materials and structures for the torque sensing and transmitting adapter to steadily measure torque, as shown in FIG. 3 and FIG. 4. When the target value is reached, the control device may promptly send a warning signal and switch off the power. In Taiwan Patent no. I454346 (U.S. Pat. No. 9,026,379), a transducing device coupled with a connector is used to connect and drive a bolt disposed of a strain sensing element (sensing bolt) for real-time clamping force inspection, as shown in FIG. 6 and FIG. 7. In US2015/0041162A1, a torque control device and a program within are used to monitor tightening torque or clamping force, but the RFID in claim 4 of the document does not participate in bolting sequence monitoring and neither are the characteristics of the RFID tag used to store information about the production traceability, sales history and bolting information of the bolt to be able to verify that a correct bolt is used or to track responsibility. However, the bolting quality and safety are especially essential for public safety-related equipment. Therefore, the accuracy of the tightening torque control, the compliance with the bolting sequence, the follow-up tracking and auditing are increasingly necessary. For the purposes of following tracking and determining the liability of bolting operations, it is required to continuously monitor the key bolting operations and to transmit, store, and save all related data.

Current advanced techniques are able to remotely monitor the fastening status of a bolt, however when bolting and if following a is prescribed bolting sequence, the order is manually marked with a color pen. The procedure is not only cumbersome, but also not trackable.

Furthermore, the widely used RFID technique has transmission power, sensing distance, and transmitting interference problems. The transmitting capability and interference problems for an RFID reader to read a nearby tagged bolt are still big challenges.

The inventor of the present invention has devised a novel monitoring system and method for bolting operations on the basis of several patents. The design overcomes the aforementioned transmitting capability and interference problems. The increased usefulness of this technique should boost its usage.

SUMMARY OF THE INVENTION

To solve the mentioned problems, the purpose of the present invention is to provide a monitoring system and method to assure the quality of bolting operations. In the system and method, the monitoring program can automatically set up bolting sequences and bolting modes for operators to perform a bolting operation. The system and the method can monitor that bolting sequences are followed by operators and can well control the torque or clamping force being applied to the target value. The system and the method can also access the production and sales history on a bolt's tag to evaluate the specification of the bolt and can also transmit the operation related information to the RFID tag of the bolt or to store the information in a peripheral sever or to a cloud server via the Internet.

The purpose of the present invention is to provide a monitoring system and the method thereof for a bolting operation. The system includes a torque tool, a torque sensing and transmitting adapter with a built-in RFID, at least one bolt attached with an RFID tag, a middle device, and a torque control device. The torque tool may be manual, pneumatic, electrical, or hydraulic driven. The torque sensing and transmitting adapter may be coupled to the torque tool or included in the torque tool. The torque sensing and transmitting adapter include an output shaft (or a socket) and an axial connection recess, which are disposed at either edge of a sense axle. The output shaft includes a through hole, the opening of which is disposed on an edge surface of the output shaft. The axial connection recess is configured to accept an output end of a torque tool. The torque sensing and transmitting adapter includes an RFID reader, a circuit board module, and a power supply module, which are electrically coupled. The RFID reader is coupled to or included in the circuit board module. The RFID reader includes a transmitting antenna, which is configured to extend through the through hole and attached to a place on the edge surface of the output shaft closest to the tag of the bolt. The built-in data in the RFID tag of the bolt can be accessed by the antenna or the bolting information sensed by the torque sensing module can be stored in the RFID tag. The middle device is a conventional socket with a hollow structure. One edge of the middle device is detachably coupled to the output end of the torque sensing and transmitting adapter, and the other edge of the middle device is detachably coupled to the driving head of the bolt. The RFID tag is attached to the driving head of the bolt to receive and store the bolt related production traceability such as manufacturer code, batch production record, the material of the bolt, grade of the bolt, and allowable maximum tightening torque and sales history data. After finishing a bolting operation, the generated bolting information including bolting time, operator ID, applied torque value, or a combination thereof is stored in the RFID tag. The data in the RFID tag may also be accessed by the RFID reader through the transmitting antenna. The production traceability information accessed by the RFID reader in the torque sensing and transmitting adapter is provided to the torque control device to evaluate whether a bolt is valid or correct and to evaluate whether the target torque is within a tolerable range. The torque control device will issue a warning if otherwise. After finishing a bolting operation, the bolting information is stored in the RFID tag through the RFID reader of the torque sensing and transmitting adapter or is stored in a peripheral server and stored in a cloud server via the Internet.

Another purpose of the present invention is to provide a monitoring method for a bolting operation. The method includes the steps of: coupling a torque sensing and transmitting adapter to or including a torque sensing and transmitting adapter in a torque tool, wherein an edge surface of an output shaft of the torque sensing and transmitting adapter is disposed with a transmitting antenna of an RFID reader; coupling an end of a middle device having a hollow structure to the output shaft; performing a bolting operation on a bolt, wherein a driving head of the bolt is connected to the other end of the middle device, and the driving head of the bolt is attached with an RFID tag; sequentially bolt by bolt accessing data of the RFID tags by the RFID reader of the torque sensing and transmitting adapter during pre-bolting to evaluate whether a specification of each bolt is valid, wherein each data set includes production traceability and sales history data of the corresponding bolt, and transmitting tag identification codes to a torque control device to generate a bolting sequence and a bolting mode and to edit and store them; during the bolting operation, continuously monitoring to see whether the bolting operation performed by an operator is according to the programmed bolting sequence or the bolting mode, and issuing a warning or stopping the torque tool if otherwise, wherein, during the bolting operation, the bolting information generated by a torque sensing module of the torque sensing and transmitting adapter is transmitted to and stored on the RFID tag of the bolt through the microprocessor and the transmitting antenna of the RFID reader.

Another purpose of the present invention is also to provide a monitoring method for a bolting operation. The method includes the steps of: coupling a middle device (transducing device), which includes a built-in RFID reader, an antenna, and a wireless communication module, to a bolt attached with an RFID tag, and driving the middle device by a torque tool to perform a bolting operation; during pre-bolting, accessing the production information, including production traceability data such as manufacturer ID, production date, batch production record, the material of bolt, grade of the bolt, and allowable maximum torque of the bolt, and sales history data such as seller and selling date of the bolt by the RFID reader and antenna of the middle device for verifying whether the bolt is valid, and transmitting tag identification codes to a torque control device to generate a bolting sequence with bolting mode and to edit and store them; during the bolting operation, continuously monitoring to see whether the bolting operation performed by an operator is according to the bolting sequence or the bolting mode, and issuing a warning or stopping the torque tool if otherwise, wherein, during the bolting operation, wirelessly or manually inputting a bolting information generated by the torque tool to the torque control device and transmitting the bolting information to the communication unit of the transducing device through the communication module, and then transmitting the bolting information through the microprocessor and the transmitting antenna of the RFID reader to the RFID tag of the bolt.

BRIEF DESCRIPTION OF THE DRAWINGS

FIG. 9 shows a monitoring method and an operational flow chart of applying a torque sensing and transmitting adapter and sensing bolt (or a tagged bolt) of the present invention.

DESCRIPTION OF THE PREFERRED EMBODIMENTS

FIG. 1 shows FIGS. 3 and 4 of U.S. Pat. No. 7,779,704 granted to the inventor of the present invention. The patent serves as a basis technique for the torque sensing and transmitting adapter of the present invention. This basis technique mainly focuses on the shock absorbable materials and structures for the torque sensing and transmitting adapter to steadily measure the torque, such that when reaching the target value, the control device may promptly send a warning signal and switch off the power. In order to incorporate an RFID reader for the present invention, the technique has to be improved.

FIG. 2 shows FIGS. 6 and 7 of U.S. Pat. No. 9,026,379 granted to the inventor of the present invention. Based on the structure of this patent, the connector is, however, prone to be damaged, and the design does not take full advantage of the writing and reading properties of the RFID device.

FIG. 3 shows FIG. 2 of US2015/0041162A1 applied by the inventor of the present invention. This document discloses a method to monitor the tightening torque and the clamping force of a bolt by using a torque control device and programs. However, the RFID mentioned in claim 4 is not used to monitor bolting sequences and the properties of the RFID tag are not used to write and read the production traceability, the sale history, and the bolting related information about the bolt to ensure that the bolt is valid and to clarify bolting responsibility.

Figure 4:
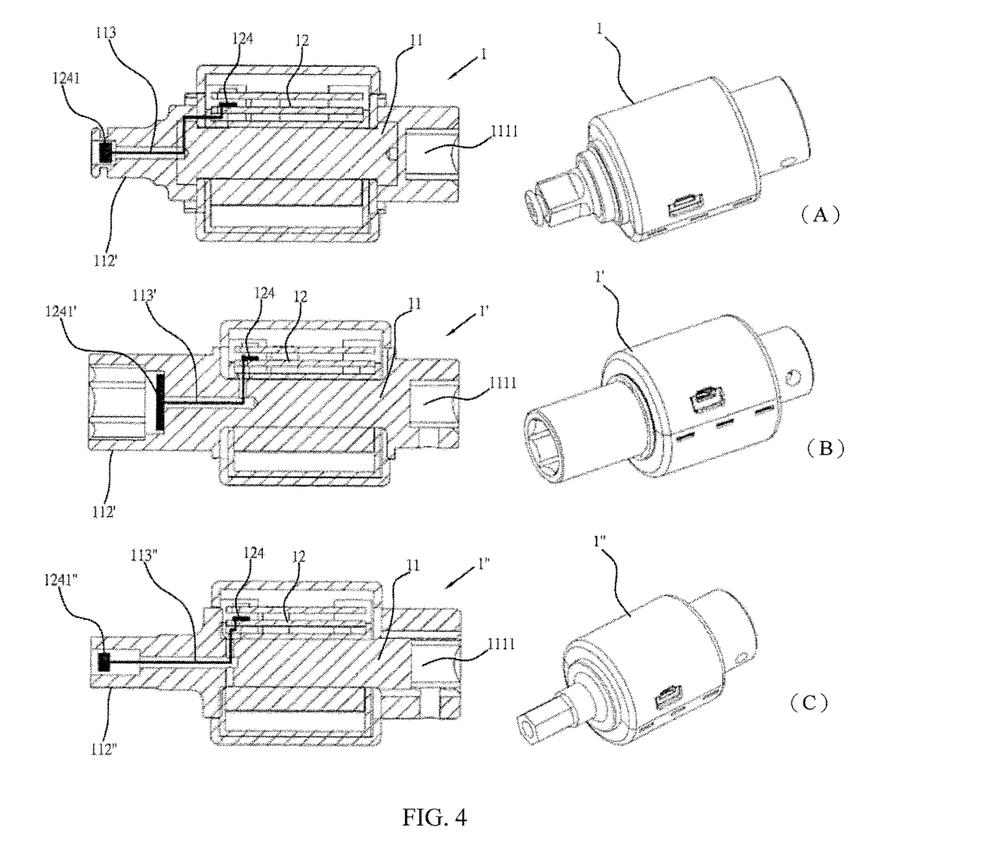
FIG. 4 shows a structure of a torque sensing and transmitting adapter of the present invention.

The following refers to FIG. 4, which is a structure of a torque sensing and transmitting adapter of the present invention. The torque sensing and transmitting adapter 1 includes an output shaft 112 and an axial connection recess 1111, which are disposed at either edge of a sense axle 11. The output shaft 112 includes a through hole 113, the opening of which is disposed on an edge surface of the output shaft 112. The axial connection recess 1111 is configured to accept an output end of a torque tool 5. The torque sensing and transmitting adapter 1 includes a power supply module 13 and a circuit board module 12, which includes a third microprocessor 121, a torque sensing module 122, an angle sensing module 125, a communication module 123, and a first RFID reader 124. The power supply module 13 and the circuit board module 12 are electrically coupled to one another. The RFID reader 124 may be connected to or built in within the circuit board module 12. An antenna 1241 of the RFID reader 124 is configured to extend through the through hole 113 to the edge surface of the output shaft 112. The antenna is glued to the edge surface. In this manner, the RFID reader may read the build-in data in an RFID tag 22' on a sensing bolt 2' or on a tagged bolt 2". In another aspect, the RFID reader may send bolting data generated by the torque sensing module 122 to store the data on the RFID tag 22' or 22". An output shaft 112 (square head) may also be a hex socket head output shaft 112' or a hex key output shaft 112" to be suitable for various shapes of bolts' heads.

Figure 5:
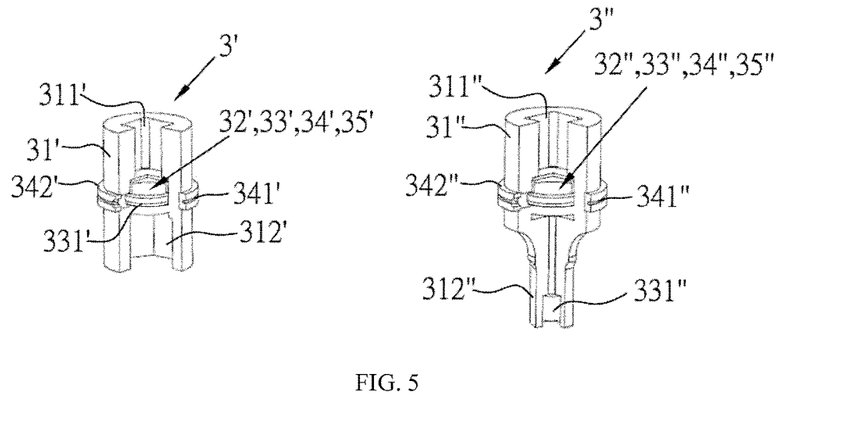
FIG. 5 shows a structure of a transducing device of the present invention.

Referring to FIG. 5, which shows a structure of a transducing device of the present invention. The transducing device has several built-in components including a third microprocessor 32', a third RFID reader 33', a third communication unit 34', and a third power unit 35'. The third microprocessor 32' includes an amplifier circuit 321' (not shown). The third communication unit 34' includes a communication antenna 341' and a communication antenna protector 342'. The third RFID reader 33' includes a third RFID antenna 331'. The transducing device 3' provides the functions of sensing and transmitting or the transducing device 3" includes a transmitting driving head. One end 311' or 311" of either of each is detachably connected to the output end of the torque tool 5, and the other end 312' or 312" is detachably connected to the driving head 21', 21", 21''', or 21'''' of a bolt attached with an RFID tag, e.g. a sensing bolt 2', a tagged bolt 2", a sensing hexagon socket head bolt 2''', or a tag hexagon socket head bolt 2''''. Depending on the type of the output end of the torque tool 5 and the type of the driving head 21', 21", 21''', or 21'''', the input end 311' or 311" and the output end 312' or 312" of the transducing device 3' or 3" may have their corresponding variants. Therefore, the transducing device can have broader applicability.

Particularly, when using the transducing device 3' on the sensing bolt 2', the data reading, writing, and storing can be done through wireless communication unit 34' and 24' without having the third RFID reader 33' on the transducing device 3' and the third RFID antenna 331' on the sensing bolt 2'.

Figure 6:
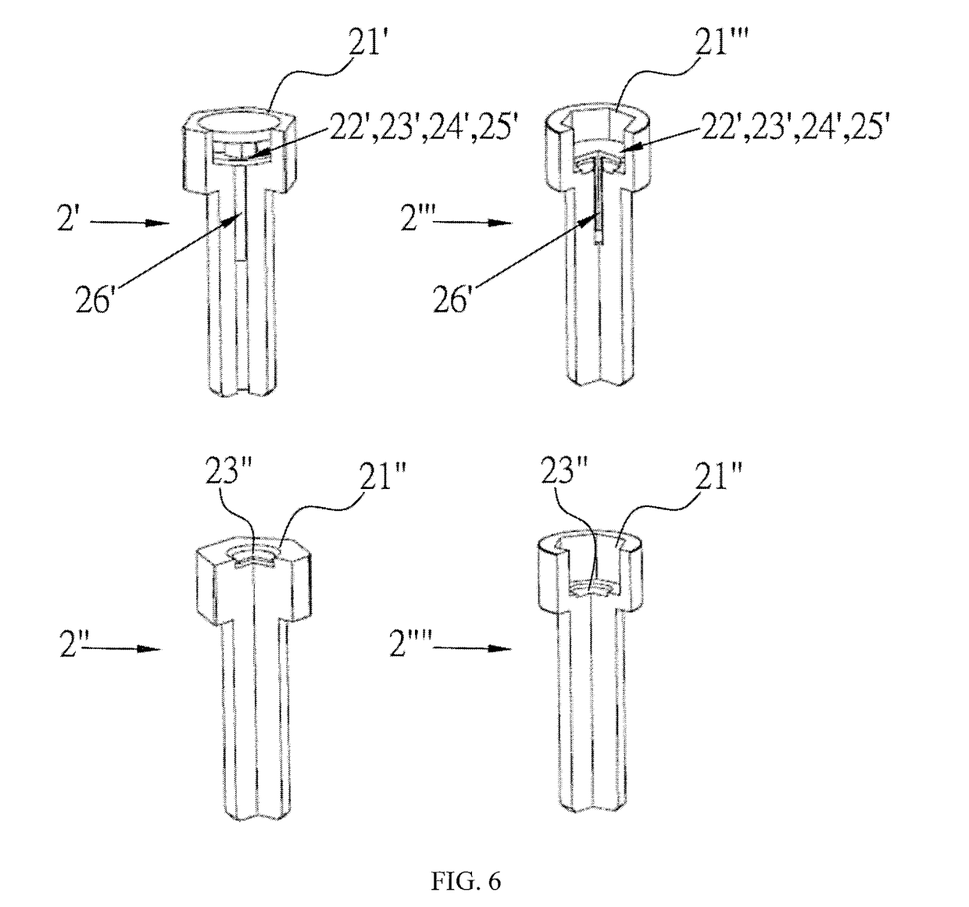
FIG. 6 shows structures of a sensing bolt and a tagged bolt of the present invention.

The following refers to FIG. 6, which shows structures of a sensing bolt and a tagged bolt of the present invention. The sensing bolt 2' or 2''' includes a second microprocessor 22', a second radio frequency identification device (RFID tag) 23', a second wireless communication unit 24', a second power unit 25', and strain sensing element 26'. The RFID reader 124 may read and save the data in the RFID tag through the RFID antenna 1241. The sensing bolt may receive and save the production traceability and the sales history data, including manufacturer code of the bolt, the batch production record, bolt materials, the grade of the bolt, maximum allowable tightening torque. The sensing bolt may also save the data generated during the bolting operation, including bolting time/date, operator ID, the applied torque value or any combination thereof. The tagged bolt 2" or 2'''' includes a first radio frequency identification device (RFID tag) 23". Data can be read from or written to the tagged bolt 2" or 2'''' through the RFID antenna 1241, but clamping force can not be measured directly. The information about torque or clamping force from the circuit board module 12 of the torque sensing and transmitting adapter can be saved to the memory of the tag through the RFID reader 123 and the RFID antenna 1241. Alternatively, the torque control device may handle the data read from the digital torque wrench and write to the memory of the tag through the microprocessor, the RFID reader 124, and the RFID antenna 1241 of the transducing device.

Figure 7:
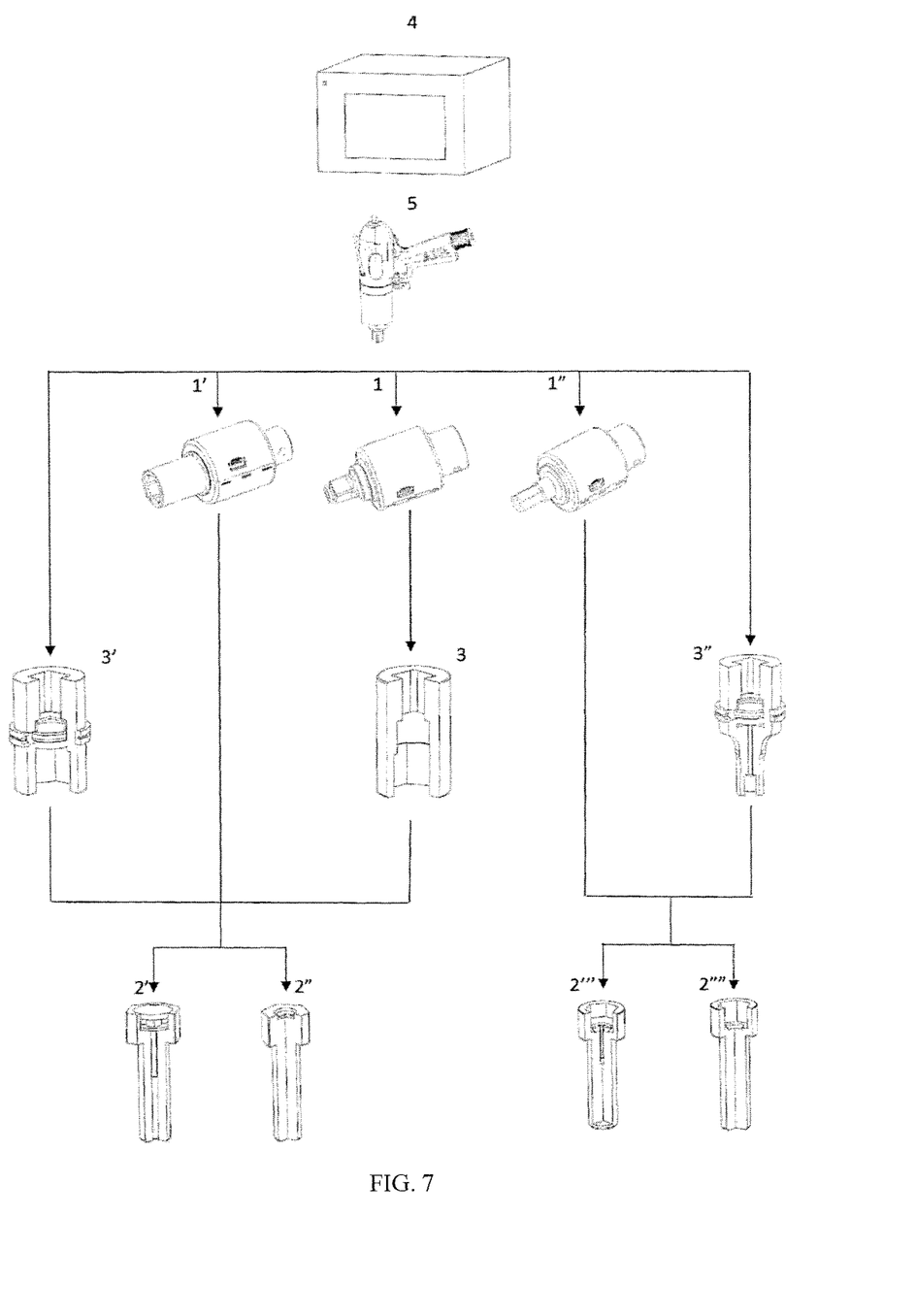
FIG. 7 shows a schematic diagram of a monitoring system for a bolting operation of the present invention.

Referring to FIG. 7, which shows a schematic diagram of a monitoring system for a bolting operation of the present invention. Square shaped axial connection recess 111 at the edge of the torque sensing and transmitting adapter is detachably connected to the output end of the torque tool 5. The output shaft 112 is detachably connected to the input end of the middle device 3 (conventional transducing device). The other end of the middle device 3 is detachably connected to the driving head 21', 21", 21''', or 21'''' of the sensing bolt 3' or the tagged bolt 2". The torque control device 4 decides if the specification of the bolt is correct based on the production traceability data in the RFID tag 23' or 23" read by the RFID reader 124 and the RFID antenna 1241. The torque control device 4 also judges and issues a warning if the setting of the target torque is not within the tolerable range. After finishing the bolting operation, the torque control device 4 sends and writes bolting operation related information to the RFID tag 23' or 23" of the bolt through the RFID reader 124 and the RFID antenna 1241 or saves the bolting information in a peripheral or cloud server. As for the torque sensing and transmitting adapter 1' with hex socket head or the torque sensing and transmitting adapter 2" with hex key head, it can be directly and detachably connected to the driving head 21', 21", 21''', or 21'''' of the sensing bolt 2' or the tagged bolt 2" with corresponding size. As for the transducing device 3' with hex socket head or 3" with hex key head, the axial connection recess 311' and 311" of it can be directly and detachably connected to the output end of the torque tool 5. The output end 312' of the transducing device 3' can be detachably connected to the driving head 21' or 21" of the sensing bolt 2' or the tagged bolt 2". The 312" of the transducing device 3" can be detachably connected to the driving head 21" or 21'''' of the sensing bolt 2''' or tagged bolt 2'. The torque control device 4 verifies whether the specification of the bolt is correct according to the production traceability data in the RFID tag (23' or 23") read by the RFID reader 33' and the RFID antenna 331' in the transducing device. The torque control device 3 also verifies the setting of the target torque sends out a warning if it is not within the tolerable range. After finishing the bolting operation, the torque control device 4 sends and writes the bolting information to the RFID tag (23' or 23") of the bolt through the RFID reader 33' of the transducing device or saves the bolting information in a peripheral or cloud server. The aforementioned connection fashions or their functions are not limited to their sizes or types.

Figure 8:
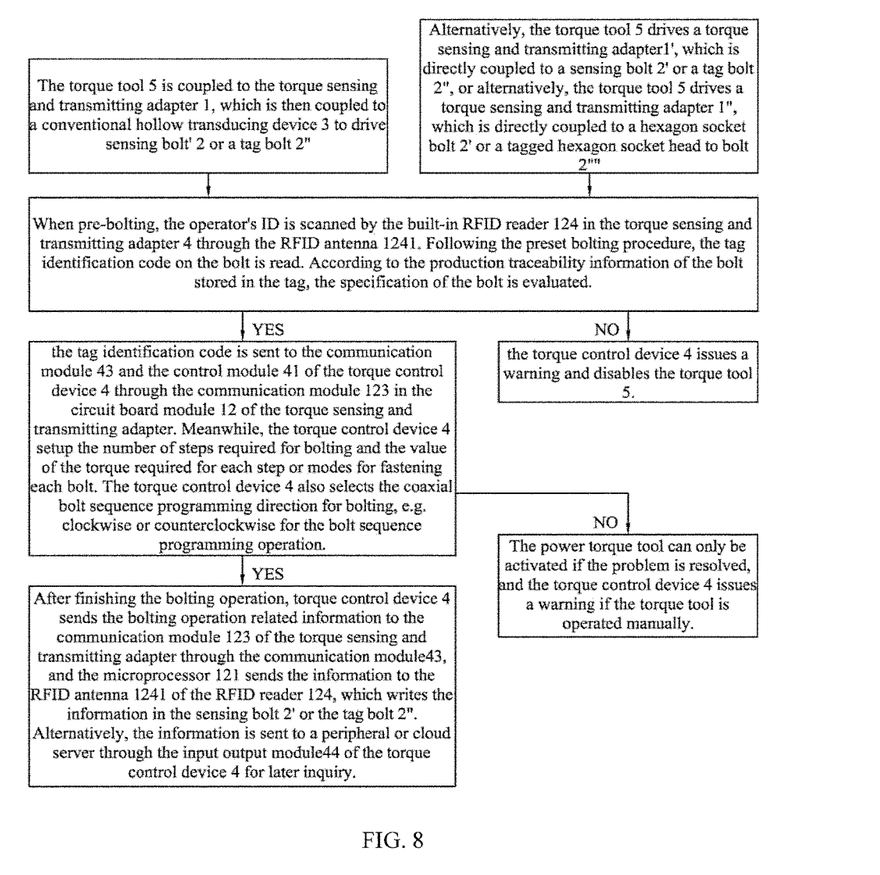
FIG. 8 shows a monitoring method and an operational flow chart of applying a transducing device and a sensing bolt (or a tagged bolt) of the present invention.

Following refers to FIG. 8, which shows a monitoring method and an operational flow chart of usage of a transducing device and a sensing bolt (or a tagged bolt) of the present invention. Also see FIG. 7 for reference. The torque tool 5 is coupled to the torque sensing and transmitting adapter 1. The conventional hollow transducing device 3 is coupled to the torque sensing and transmitting adapter 1 to drive a sensing bolt 2' or a tagged bolt 2". Alternatively, the torque tool 5 drives a torque sensing and transmitting adapter 1', which is directly coupled to a sensing bolt 2' or a tagged bolt 2".

Alternatively, the torque tool 5 drives a torque sensing and transmitting adapter 1", which is directly coupled to a hexagon socket head bolt 2' or a tagged hexagon socket head bolt 2'. When pre-bolting, the operator's ID is scanned by the RFID reader 124 built-in in the torque sensing and transmitting adapter 1 through the RFID antenna 1241. Following the preset bolting procedure, the tag identification code on the bolt is read. According to the production traceability information of the bolt stored in the tag, the specification of the bolt is evaluated. If the bolt specification is not valid, the torque control device 4 issues a warning and disables the torque tool 5. If the specification is valid, the tag identification code is sent to the communication module 43 and the control module 41 of the torque control device 4 through the communication module 123 in the circuit board module 12 of the torque sensing and transmitting adapter. Meanwhile, the torque control device 4 sets up the number of steps required for bolting and the value of the torque required for each step or modes for fastening each bolt. The torque control device 4 also selects the coaxial bolt sequence programming direction for bolting, e.g. clockwise or counterclockwise for the bolt sequence programming operation. The bolting is then performed. The torque control device 4 continuously monitors the bolting sequence, the bolting mode for each step, and the torque applied in each step. A warning will be issued if there is any problem and the power torque tool can only be activated if the problem is resolved, and the torque control device 4 issues a warning if the torque tool is operated manually. After finishing the bolting operation, the torque control device 4 sends bolting operation related information to the communication module 123 of the torque sensing and transmitting adapter through the communication module 43, and the microprocessor 121 sends the information through the RFID antenna 1241 of the RFID reader 124 to write the information in the sensing bolt 2' or the tagged bolt 2". Alternatively, the information is sent to a peripheral or cloud server through the input-output module 44 of the torque control device 4 for later inquiry.

Following refers to FIG. 9, which shows a monitoring method and an operational flow chart of applying a torque sensing and transmitting adapter and sensing bolt (or a tagged bolt) of the present invention. Also see FIG. 7 for reference. A transducing device 3' is coupled to the torque tool 5 to drive a sensing bolt 2' or a tagged bolt 2". Alternatively, a transducing device 3" including a transmitting driving head is used to drive a sensing hexagon socket head bolt 2''' or tag hexagon socket head bolt 2''''. While pre-bolting, the RFID reader 33' of the transducing device 3' or the transducing device 3" scans the operator's ID through the RFID antenna 331'. According to the preset bolting sequence, the tag identification code on the bolt is read. According to the production traceability information of the bolt stored in the tag, the specification of the bolt is evaluated. If the specification is not valid, the torque control device 4 issues a warning signal and disables the torque tool 5. If the specification is valid, the tag identification code is sent to the control module 41 through the communication unit 34' of the transducing device 3' or 3" and through the communication module 43 of the torque control device 4. Meanwhile, the torque control device 4 sets up the number of steps required for bolting and the value of the torque required for each step or modes for fastening each bolt. The torque control device 4 also selects the coaxial bolt sequence programming direction for bolting, e.g. clockwise or counterclockwise for the bolt sequence programming operation. The torque control device 4 continuously monitors the bolting sequence, the bolting mode for each step, and the torque applied in each step. A warning will be issued if there is any problem. The power torque tool 5 can only be activated if the problem is resolved, and the torque control device 4 issues a warning if the torque tool is operated manually. After finishing the bolting operation, torque control device 4 sends the related information to the communication unit 34' of the transducing device 3' or 3" through the communication module 43. The microprocessor 32' then sends the information through the RFID antenna 331' of the RFID reader 33' to write the information in the tag of the bolt. Alternatively, the information is sent to a peripheral or cloud server through the input-output module 44 of the torque control device 4 for later inquiry.

Figure 10:
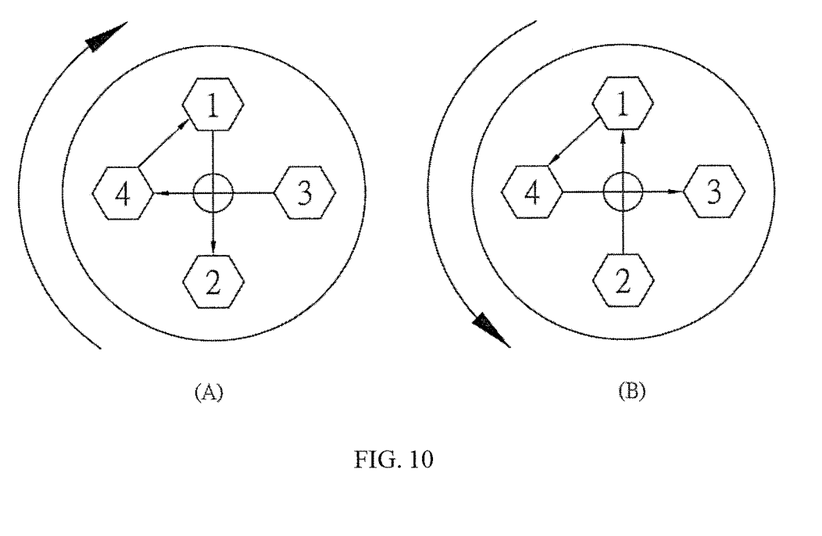
FIG. 10 shows a bolting sequence monitoring method of the present invention.

The following refers to FIG. 10, which shows a bolting sequence monitoring method of the present invention. The method is mainly based on the structure of the present invention and the RFID reader 124 is disposed in the torque sensing and transmitting adapter or the transducing device. The RFID antenna 1241 of the RFID reader 124 is led to the closest driving head (21', 21", 21''', or 21'''') attached with the RFID tag 23' of the bolt, or the RFID antenna 331" of the transducing device 3' or 3" with built-in microprocessor 32', RFID reader 33', communication unit 34', and power unit 35' is moved to the closest driving head (21', 21", 21''', or 21'''') attached with the RFID tag 23' of the bolt. Thereby the information can be read and written without interfering. (The RFID tag may include surface acoustic wave RFID device, such that the power supply unit can be omitted).

When pre-bolting:

1. The tag information is read through the RFID antenna of the RFID reader to determine whether the bolt is correct.

2. During learning mode, the ID serial numbers of the bolt tags are read following the preset bolting sequence. The bolt sequence is transmitted, memorized, and saved in the control module 41 of the torque control device 4. During scanning, the bolting modes (time, torque, angle, or a combination thereof) for specific bolts can be setup, and the control module 41 can simultaneously finish the editing of the bolting sequence. The editing of the sequence can be further defined as 3. During bolting mode, the operator may take any one of the bolts to start with. The following is the demonstration.

As shown in FIG. 10(A), if the coaxial clockwise direction is chosen and the pre-bolting sequence is 3→4→1→2, the operator may choose any bolt to start with. For example, the bolting sequence may be 2→1→3→4, 4→3→2→1, 3→4→1→2, or 1→2→4→3.

As shown in FIG. 10(B), if the coaxial counterclockwise direction is chosen and the pre-bolting sequence is 2→1→4→3, the operator may choose any bolt to start with. For example, the bolting sequence may be 3→1→2, 3→4→2→1, 2→1→4→3, or 1→2→3→4.

In addition to the device having RFID element and the sensing bolt for the sensing element in claim 4 of US2015/0041162 A1, under the structure designed in the present invention, which has ID code on the bolt for the RFID device and the torque sensing and transmitting adapter or transducing device built-in with RFID reader and RFID antenna, the production traceability and the sales history data of the bolt stored in the RFID tag can be retrieved without being interfered in the conditions of limited space and transmission power. The specification of the bolt is also confirmed before bolting. When the bolting is complete, the related bolting information such as operator ID, working time/date, the applied torque, and/or the magnitude of the clamping force are stored in the tag memory through RFID reader and RFID antenna. The information may also alternatively be stored in a peripheral through wireless communication module or stored in cloud server via the Internet. With the information, the quality of the bolt, the bolting sequence, the applied torque, and the clamping force can be fully monitored for later tracking. This can help to clarify the bolting responsibility.

Aside from monitoring the bolting sequence, the monitoring system and the method of the present invention can provide setup for each bolt such as the number of bolting steps and the percentage of the target torque or torque required for each step. For example, a bolting procedure requires 3 steps to reach the target torque 100 NM. In step 1, 50% of the target torque or 50 NM is applied. In step 2, 75% of the target torque or 75 NM is applied. In step 3, the target torque or 100 NM is achieved. The torque control device 4 monitors the bolting procedure all the time. Only when the target value in the step for each bolt is achieved, the following step can be executed. The torque control device will send warning signal and put it on record if an operator does not follow the bolting procedure. The number of valid or invalid bolts can also be calculated.

The description above is only for the purpose of illustration but not a restriction. Without departing from the spirit of the present application, any equivalent modification or alteration should be considered as falling within the protection scope of the appended claims.

What is claimed is:

1. A monitoring system for a bolting operation, comprising:
    a torque tool, which is manual, pneumatic, electrical, or hydraulic;
    an RFID reader, which is disposed in a torque sensing and transmitting adapter or a middle device, retrieving built-in data on an RFID tag of a bolt or transmitting and writing bolting data generated by a torque sensing module on the RFID tag, wherein
    the torque sensing and transmitting adapter is connected to the torque tool or built in the torque tool and comprises an output shaft and an axial connection recess respectively disposed at two edges of the torque sensing and transmitting adapter, wherein
    the output shaft comprises a through hole and an opening of the through hole is disposed on an edge surface of the output shaft and the axial connection recess is connected to an output end of the torque tool;
    the torque sensing and transmitting adapter comprising a circuit board module and a power supply module connected to each other, wherein
the RFID reader is connected to or built in the circuit board module and a transmitting antenna of the RFID reader is disposed through the through hole and attached to the edge surface of the output shaft, wherein
an edge of the middle device is detachably connected to the output end of the torque sensing and transmitting adapter, and another edge of the middle device is detachably connected to the driving head of the bolt, wherein
when the RFID reader is disposed on the middle device, an edge of the middle device is detachably connected to the output end of the torque tool, wherein
the middle device comprises a microprocessor, an RFID reader, a communication unit, and a power unit electrically coupled to one another, wherein
the transmitting antenna of the RFID reader is adhesively disposed on a place of the middle device closest to the driving head of the bolt, wherein
the RFID antenna extends to be as close to the RFID tag of the bolt as possible for better data reading and writing;
    at least one bolt, which is a tagged bolt having the RFID tag disposed on the driving head, receiving and storing production traceability data comprising a manufacturer code, a batch production record, bolt material, grade of the bolt, or the maximum allowable tightening torque, and sales history data, and storing the bolting data generated after finishing the bolting operation, wherein
the bolting data comprises bolting time, operator ID of whom performs the bolting, torque value applied to fasten the bolt or a combination thereof, and wherein
the data stored in the RFID tag may be accessed through the transmitting antenna of the RFID reader to read or store the data stored in the RFID tag; and
    a torque control device processing the production traceability data in the RFID tag on the bolt received by the RFID antenna to evaluate the data and issue a warning if the bolt is not valid or the target torque is not within a tolerable range, and sending bolting data to be stored on a peripheral or cloud server via the Internet or sending the bolting data to be stored on the RFID tag of the bolt through the RFID antenna of the RFID reader;
    wherein the torque control device comprises a programmable operation monitoring mode, which performs a bolting operation after memorizing and editing a bolting sequence and a bolting operation mode according to a plurality of the tag identification codes of a plurality of bolts sequentially read and transmitted by the RFID reader, and the torque control device sends a warning signal or cuts the power to stop the torque tool if the operator does not follow the bolting sequence or the bolting mode during the bolting operation.

2. The monitoring system for a bolting operation of claim 1, wherein:
    the RFID reader reads and transmits a plurality of tag identification codes of the plurality of the bolts to the torque control device for recording and editing the bolting sequence, which is programmed to be coaxial clockwise or coaxial counterclockwise, and the operator may take any one of the bolts to start with.

3. The monitoring system for a bolting operation of claim 1, wherein:
    the RFID reader is disposed in the middle device, the middle device is a transducing device, comprising the built-in RFID reader, the RFID antenna, the microprocessor, the power unit, the communication unit, and the communication antenna, and the RFID reader reads and sends the data in the RFID tag to the torque control device which edits and monitors the bolting sequence and writes the information of the bolt to the RFID tag, and the types of the input end axial connection recess and the output end of the middle device are chosen to match the output end of the torque tool and the bolt head type.

4. The monitoring system for a bolting operation of claim 1, wherein:
    the RFID reader is disposed in the torque sensing and transmitting adapter, wherein the output shaft of the torque sensing and transmitting adapter is of hexagon socket type, hex key type or another suitable type to drive various kinds of bolts and the socket comprises a through hole for the RFID antenna to extend through and to be adhesively attached to the edge surface of the output shaft as close to the driving head of the bolt as possible for the RFID antenna to read the built-in data in the RFID tag of the bolt or for the RFID antenna to transmit the bolting data generated by the torque sensing module and store in the RFID tag.

5. The monitoring system for a bolting operation of claim 1, wherein:
    the tagged bolt attached with the RFID tag is also a sensing bolt having built-in elements, the built-in elements comprising a microprocessor, a strain sensing element, a wireless communication module, and a power unit, wherein the RFID tag of the tagged bolt or the sensing bolt is in a location that can communicate with the RFID antenna effectively.

6. A monitoring system for a bolting operation, comprising:
    a torque tool, which is manual, pneumatic, electrical, or hydraulic;

at least one bolt being a sensing bolt having built-in elements comprising a microprocessor, a strain sensing element, a wireless communication module, and a power unit;

a middle device being a transducing device having built-in elements comprising a microprocessor, a power unit, a wireless communication antenna, wherein the middle device reads and transmits a sensing signal of the bolt;

a torque control device receiving the sensing signal from the middle device and recording and editing a bolting sequence and a bolting operation mode followed by the bolting operation, wherein, during the bolting operation, if an operator does not follow the bolting sequence or the bolting mode, the torque control device issues a warning signal or cuts the power to stop the torque tool, and, when the bolting operation is complete, the torque control device stores bolting data, which comprises bolting time, operator ID, applied torque value, or a combination thereof, to a peripheral or cloud server via the Internet;

wherein the middle device also writes data of the bolt to the memory unit of the microprocessor of the bolt and the types of the input end axial connection recess and the output end of the middle device are chosen to fit the output end of the torque tool and the head of the bolt;

wherein the middle device sequentially reads and transmits the plurality of sensing signals of the plurality of bolts to the torque control device, which records and edits the bolting sequence.

7. The monitoring system for a bolting operation of claim 6, wherein:

a programmed coaxial clockwise or coaxial counterclockwise direction is used to perform the bolting operation, and the operator may take any one of the bolts to start with.

8. A monitoring system for a bolting operation of a plurality of bolts, each of the plurality of bolts having an RFID tag with a memory storing a tag identification code thereof, the system comprising:

an RFID reader configured to access the RFID tag of the plurality of bolts through an RFID antenna;

a torque control device coupled to the RFID reader, the control device being programmed with a bolting sequence of the plurality of bolts in the bolting operation;

wherein in the bolting operation, the RFID reader reads the tag identification codes of the plurality of bolts and sends the tag identification codes to the torque control device, and the torque control device decides whether the bolting of the bolts is in compliance with the bolting sequence according to the identification codes sequentially read and transmitted by the RFID reader, and a warning is issued if the bolting of the bolts is not in compliance with the bolting sequence.

9. The monitoring system for a bolting operation of a plurality of bolts of claim 8, wherein:

the RFID reader is disposed in a torque sensing and transmitting adapter connected to a torque tool or built in the torque tool, the torque sensing and transmitting adapter comprises an output shaft and an axial connection recess respectively disposed at two edges of the torque sensing and transmitting adapter;

wherein the output shaft comprises a through hole and an opening of the through hole is disposed on an edge surface of the output shaft and the axial connection recess is connected to an output end of the torque tool; and the transmitting antenna of the RFID reader is disposed through the through hole and attached to the edge surface of the output shaft.

10. The monitoring system for a bolting operation of a plurality of bolts of claim 9, wherein:

the output shaft of the torque sensing and transmitting adapter is of hexagon socket type, hex key type or another suitable type to drive various kinds of bolts and the socket comprises a through hole for the RFID antenna to extend through and to be adhesively attached to the edge surface of the output shaft as close to the driving head of the bolt as possible for the RFID antenna to read the built-in data in the RFID tag of the bolt or for the RFID antenna to transmit the bolting data generated by the torque sensing module and store in the RFID tag.

11. The monitoring system for a bolting operation of a plurality of bolts of claim 8, wherein:

the RFID reader is disposed on a middle device, an edge of the middle device is detachably connected to an output end of a torque tool; and the transmitting antenna of the RFID reader is adhesively disposed on a place of the middle device closest to the driving head of the bolt.

12. The monitoring system for a bolting operation of a plurality of bolts of claim 8, wherein:

the middle device is a transducing device, comprising the built-in RFID reader, the RFID antenna, the microprocessor, the power unit, the communication unit, and the communication antenna, and the RFID reader reads and sends the data in the RFID tag to the torque control device which edits and monitors the bolting sequence and writes the information of the bolt to the RFID tag, and the types of the input end axial connection recess and the output end of the middle device are chosen to match the output end of the torque tool and the bolt head type.

13. The monitoring system for a bolting operation of a plurality of bolts of claim 8, wherein:

the RFID reader reads and transmits the plurality of tag identification codes of the plurality of the bolts to the torque control device for recording and editing the bolting sequence, which is programmed to be coaxial clockwise or coaxial counterclockwise, and the operator may take any one of the bolts to start with.

* * * * *